US012803492B2

(12) United States Patent
Tittle

(10) Patent No.: US 12,803,492 B2
(45) Date of Patent: Nov. 17, 2026

(54) SOLAR POWER POLE SYSTEM

(71) Applicant: Larry Tittle, Metairie, LA (US)

(72) Inventor: Larry Tittle, Metairie, LA (US)

( * ) Notice: Subject to any disclaimer, the term of this patent is extended or adjusted under 35 U.S.C. 154(b) by 86 days.

(21) Appl. No.: 18/786,079

(22) Filed: Jul. 26, 2024

(65) Prior Publication Data

US 2026/0031756 A1 Jan. 29, 2026

(51) Int. Cl.
*H02S 10/40* (2014.01)
*H02S 40/20* (2014.01)
*H02S 40/32* (2014.01)
*H02S 40/38* (2014.01)

(52) U.S. Cl.
CPC .............. *H02S 10/40* (2014.12); *H02S 40/20* (2014.12); *H02S 40/32* (2014.12); *H02S 40/38* (2014.12)

(58) Field of Classification Search
CPC ..................... H02S 20/00–32; H02S 30/00–20
USPC ................................................. 136/243–265
See application file for complete search history.

(56) References Cited

U.S. PATENT DOCUMENTS

2007/0240758 A1* 10/2007 Spartz ..................... H10F 77/14
257/E31.037
2009/0040750 A1* 2/2009 Myer ...................... F21S 8/083
136/246

FOREIGN PATENT DOCUMENTS

CN 108616240 A * 10/2018 ............ H02S 20/00
CN 210162189 U * 3/2020
CN 214591295 U * 11/2021
KR 20200038086 A * 4/2020 ............ H02S 20/23

OTHER PUBLICATIONS

KR-20200038086-A English (Year: 2020).*
CN-210162189-U English (Year: 2020).*
CN-214591295-U English (Year: 2021).*
CN-108616240-A (Year: 2018).*

* cited by examiner

*Primary Examiner* — Bach T Dinh
(74) *Attorney, Agent, or Firm* — Juan J. Lizarraga

(57) ABSTRACT

A solar power pole system with multiple vertical fixed length solar power poles with outer flexible solar panels or solar laminate film attached to the outer surfaces and mounted on a mobile trailer with a battery for storage of electrical energy from the solar panels, a controller to regulate charging of the battery, an inverter to convert DC power to AC power, and LED lighting with controls to provide electrical power needed in disasters, for remote area communications, public safety at construction sites and other situations that require power with minimal setup time and effort. Alternatively, or in combination, use of a telescoping solar power pole mounted on a mobile trailer or mounted directly to a concrete or metallic base.

4 Claims, 8 Drawing Sheets

SOLAR POWER POLE SYSTEM

BACKGROUND OF THE INVENTION

This invention relates to a system of solar power poles of either circular or square cross section with flexible or semi-flexible solar panels or solar laminate film affixed to the outer surfaces of the poles to provide electrical power needed in disasters, for remote area communications, public safety at construction sites and other situations that require power with minimal setup time and effort. It is intended that the system be mobile and trailer mounted with at least one solar power pole vertically affixed to the mobile trailer.

As the global effects of climate change become more pronounced with frequent power outages following tornados, storms, hurricanes and other natural catastrophes, there is an immediate need for a readily deployable mobile solar power system. The inventive system can be used in disaster relief, remote area communications, public safety and many events with minimal setup time and effort.

While the solar power poles affixed to a trailer can be of a fixed length, a telescoping solar power pole can also be trailer mounted either with or without fixed length solar power poles to provide more solar power and better efficiency in utilizing solar energy. This configuration would allow adjustable heights for optimal performance. The solar power poles affixed to a trailer can be aggregated to meet larger power requirements. Where electrical power is not normally or readily available, a telescoping solar power pole can be mounted directly to a concrete or metallic base.

As an integral part of the inventive system all trailer mounted solar power poles will be connected directly to the mobile trailer with an encapsulated wiring harness on the underside of the trailer.

SUMMARY OF THE INVENTION

It is an object of this invention to provide a solar power system for solar power poles of either round or square cross section with a vertical longitudinal axis and mounted on a movable trailer comprising at least one hollow solar power pole of fixed length and circular cross section with a vertical longitudinal axis, an external surface and having a bottom end and an upper end with a cap and where a flexible solar panel is attached to the external surface, mounted on a movable trailer with wheels, towing hitch, and having an upper surface with lower support rings for direct attachment of the bottom end of solar power poles and an underside with an encapsulated wiring harness with direct connection to the solar panels attached to the external surface of each solar power pole, and also including a battery for storage of electrical energy from each of the flexible solar panels attached to the external surface of the solar power poles, a controller to regulate charging of the battery, and an inverter to convert DC power to AC power.

It is a further object of this invention that the upper end cap of the solar power pole has a mounting hole to receive a threaded rod of such length as to reach and pass through a lower mounting hole in the lower support ring on the upper surface of the movable trailer to secure the solar power pole in the lower support ring with nuts and washers.

It is a further object of this invention to provide solar power system with a telescoping solar power pole with a vertical longitudinal axis to supplement and enhance the capability of vertical fixed length solar power poles affixed to the upper surface of a movable trailer comprising at least two vertical hollow solar poles with a bottom solar pole and an upper solar pole, each solar pole having a bottom end and an upper end, the bottom solar pole having a diameter greater than the diameter of the upper solar pole, in order that the upper solar pole can be housed in the lower solar pole, each solar pole having an external surface and internal surface where a flexible solar panel is attached to the external surface of the bottom solar pole and upper solar pole, and a vertical linear guide rail is affixed to the external surface of the upper solar pole to guide vertical movement of the upper solar pole to extend it out an above the bottom solar pole with a base ring fitted to the bottom end of the bottom solar pole for attachment to the upper surface of a mobile trailer, and a cap end fitted to the upper end of the upper solar pole, and a telescoping mechanism housed within the vertical hollow solar poles to vertically raise and lower the upper solar pole, comprising a multiplicity of concentrically fitted round or square pistons driven by a linear drive mechanism attached at the top to the cap end at the upper end of the upper solar pole, and at the bottom end of the bottom solar pole at the base ring. Also included are LED lights, cameras and sensors mounted to a light control box attached to the cap end at the upper end of the upper solar pole, with a control box to provide remote functionality to the telescoping mechanism and LED lights, cameras and sensors, a battery for storage of electrical energy from each of the flexible solar panels attached to the external surface of the solar power poles, a controller to regulate charging of the battery and an inverter to convert DC power to AC power. It is understood that the battery, controller and inverter are external to the telescoping solar power pole.

It is a further object of this invention and an alternate embodiment that the telescoping solar power pole mechanism be remotely operated through the control box using pneumatic, hydraulic, manual, motorized or cable-driven power.

It is a further object of this invention that the telescoping solar power pole can be mounted directly to a concrete or metallic base.

DETAILED DESCRIPTION OF THE INVENTION

Figure 1:
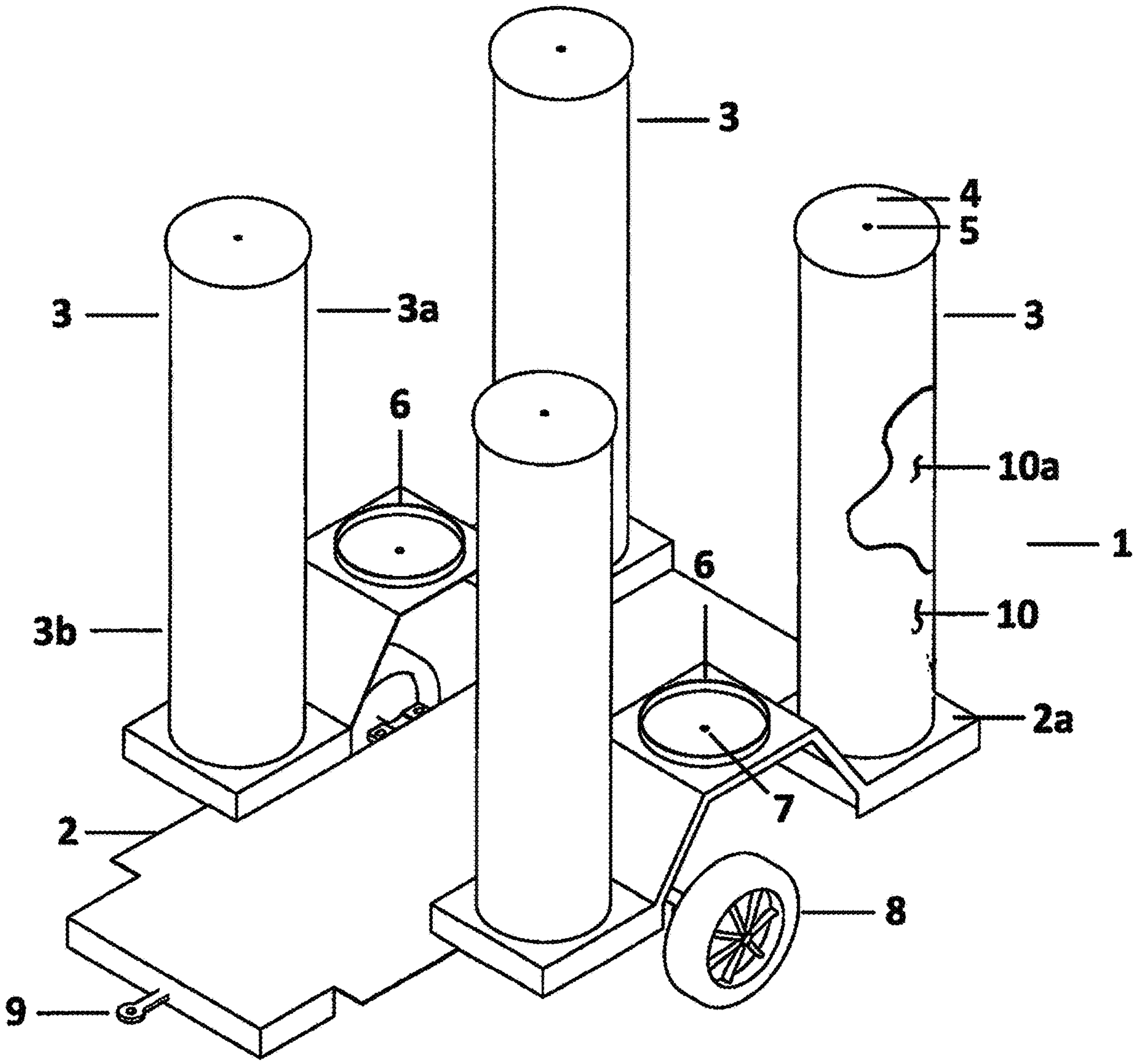
FIG. 1 is a perspective view of the trailer mounted solar power pole system showing four fixed length solar power poles.

The perspective view shown in FIG. 1 shows the solar power pole system 1 mounted on a mobile trailer 2 with wheels 8, a trailer hitch 9, and an upper surface 2*a*. In this depiction there are two exposed lower mounting rings 6 on the upper surface 2*a*, and four fixed length hollow vertical solar power poles 3, also shown individually in FIG. 3. Also shown within the lower mounting rings 6 is a lower mounting hole 7. As shown in FIG. 1, this mobile trailer 2 has the capacity to carry a total of six fixed length vertical solar power poles 3, but any number of solar power poles 3 would be acceptable and multiple mobile trailers 2 could be used depending on the power requirements.

Figure 3:
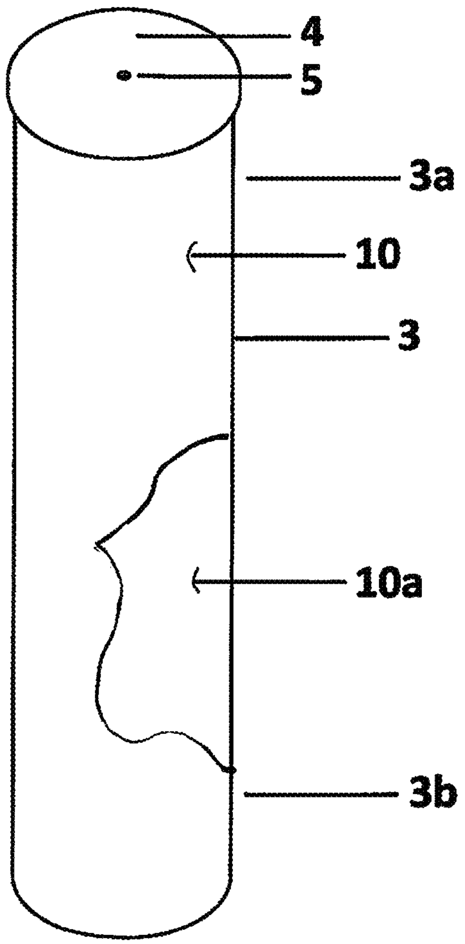
FIG. 3 is a perspective view of a fixed length solar power pole.

It is understood that the four solar power poles 3 shown in FIG. 1 and FIG. 3 have an outer surface 10 that is covered by a solar laminate film 10*a*. An alternative to the solar laminate film 10*a* would be a flexible solar panel. It is also understood the four solar power poles 3 shown in FIG. 1 are mounted on lower mounting rings 6, unseen at the bottom end 3*b* of the solar power poles 3.

Figure 3A:
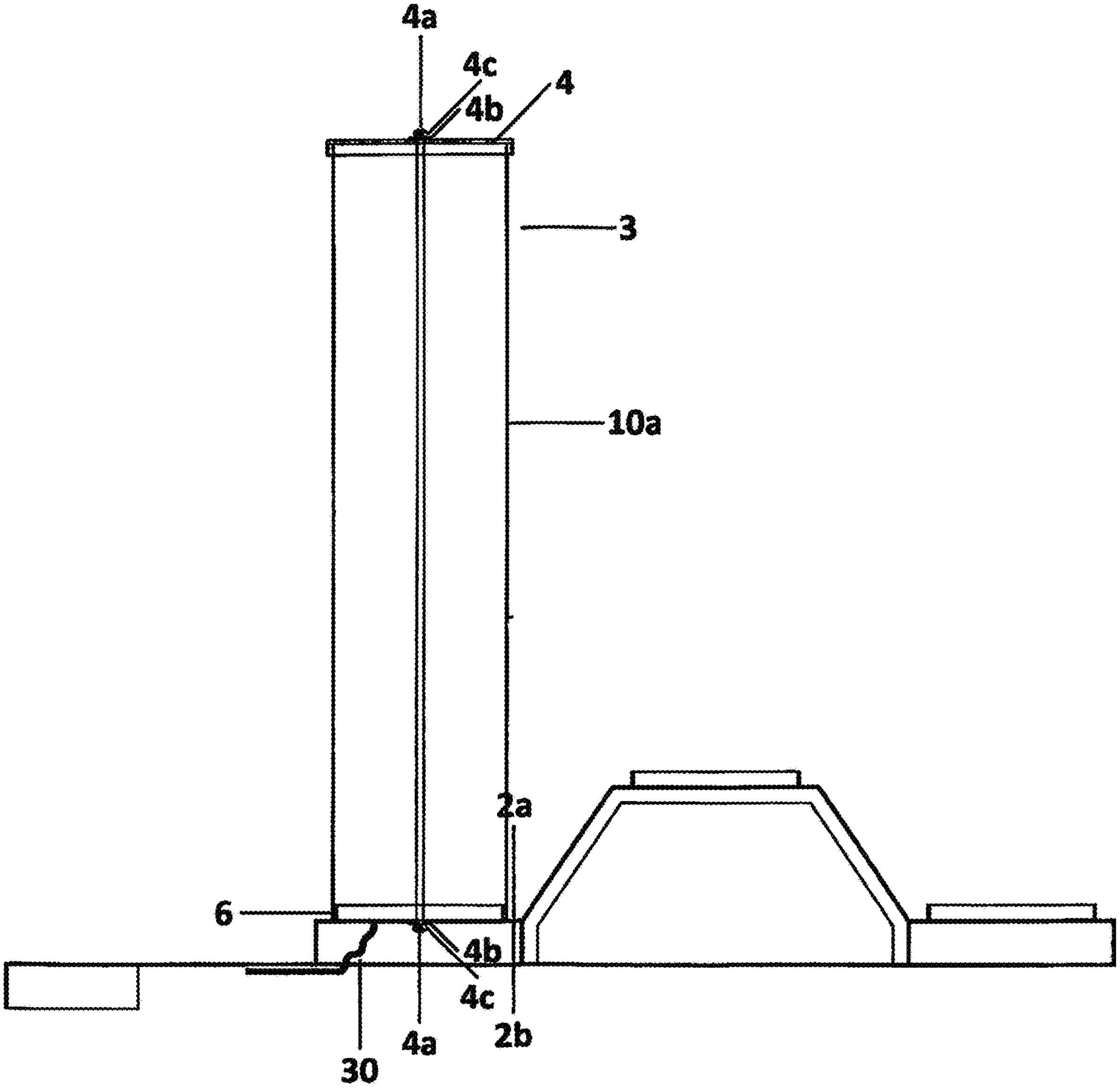
FIG. 3A is a cross sectional view of a fixed length solar power pole.

Also shown in FIG. 1 is an upper cap 4 for each of the solar power poles 3 with an upper mounting hole 5. While not shown, it is understood that with the upper cap 4 in place and the solar power poles 3 set over a mounting ring 6, the solar power poles 3 can be firmly secured to the mobile trailer 2 by inserting a threaded rod 4*a*, as shown in FIG. 3A, through the upper mounting hole 5 down and through the lower mounting hole 7 and securing both ends of the threaded rod 4*a* with washers 4*b* and nuts 4*c*.

Figure 2:
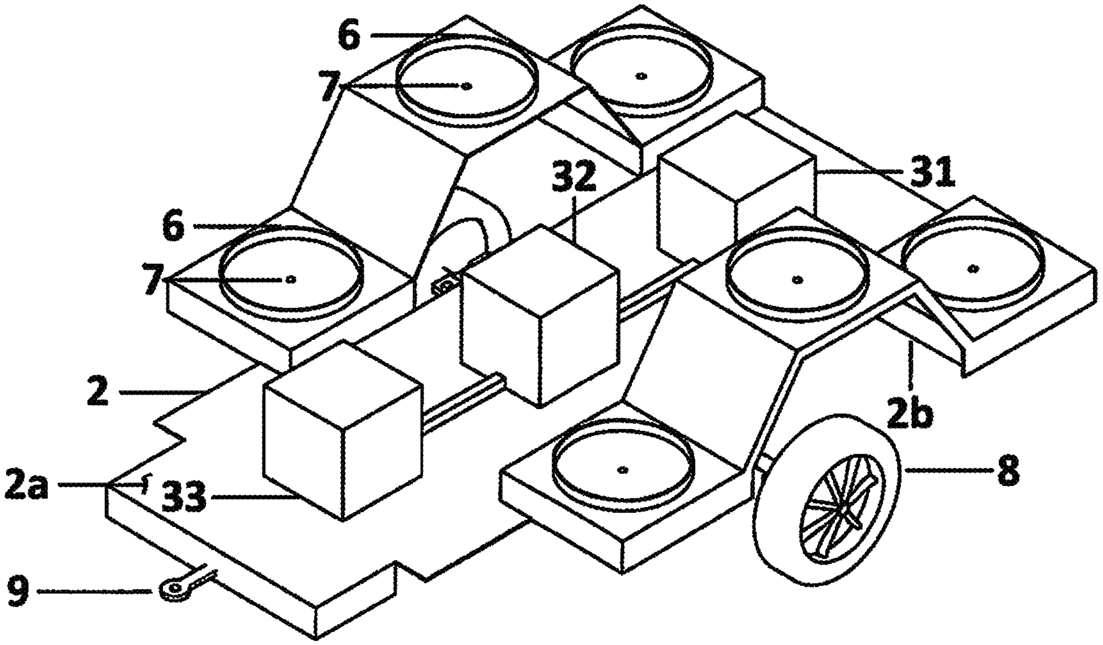
FIG. 2 is a perspective view of a trailer for the solar power pole system showing the mounting rings for six fixed length solar power poles.

The perspective view shown in FIG. 2 shows a mobile trailer 2 without any fixed length hollow vertical solar power poles 3, but shows a multiplicity of exposed lower mounting rings 6 on the upper surface 2*a* of the trailer 2. As shown, the mounting rings 6 are sized to concentrically fit in the bottom end 3*b* of the solar power poles 3. While the solar power poles 3 and the lower mounting rings 6 are shown as being round with circular cross section, an alternate but totally suitable configuration would be a square cross section.

Also shown in FIG. 2 are the lower mounting holes through which a threaded rod 4*a* passed through the upper mounting hole 5 in the upper cap 4 of a solar power pole would be inserted and secured with washers 4*b* and nuts 4*c* both at the upper cap 4 and the under surface 2*b* of the mobile trailer 2.

It is understood that the solar laminate film 10*a* attached to the outer surface 10 of each solar power pole 3 would be directly wired to an encapsulated wiring harness 30 to a battery 31, a controller 32 to regulate charging of the battery 31, and an inverter 33, all mounted on the mobile trailer 2.

Figure 4:
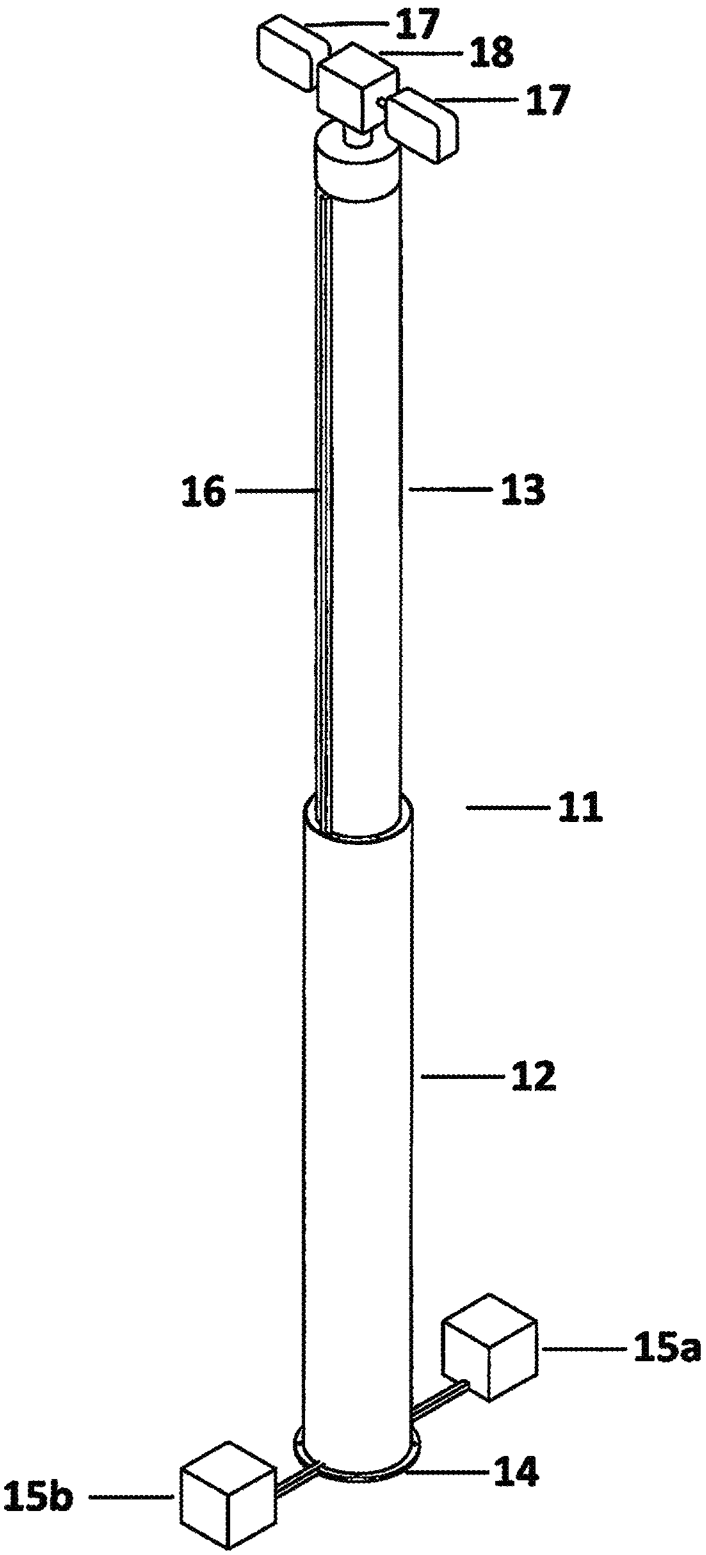
FIG. 4 is a perspective view of a telescoping solar power pole with the upper solar power pole fully extended.

The perspective view in FIG. 4 shows an alternative embodiment of the solar power pole system 1 shown in FIG. 1 with a telescoping solar power pole 11 having a vertical longitudinal axis with a hollow bottom solar power pole 12 and a hollow upper solar power pole 13, each having a bottom end and an upper end, the bottom solar power pole 12 having a diameter greater than the diameter of the upper solar power pole 13, in order that the upper solar power pole 13 can be housed in the bottom solar power pole 12. Each solar power pole has an external surface and internal surface where a flexible solar panel is attached to the external surface of the bottom solar power pole 12 and upper solar power pole 13. As depicted in FIG. 4, the telescoping solar power pole 11 is in a fully extended position, with a vertical linear guide rail 16 affixed to the outer surface of the upper upper solar power pole 13 to guide vertical movement of the upper upper solar power pole 13. Also shown is a base ring 14 for securing the telescoping solar power pole 11 to the upper surface 2*a* of a mobile trailer 2. Also depicted in FIG. 4 are LED lights, cameras and sensors 17 and a light control box 18 at the upper end of the telescoping solar power pole 11 along with a control and inverter box 15*a* and a battery box 15*b*.

Figure 5:
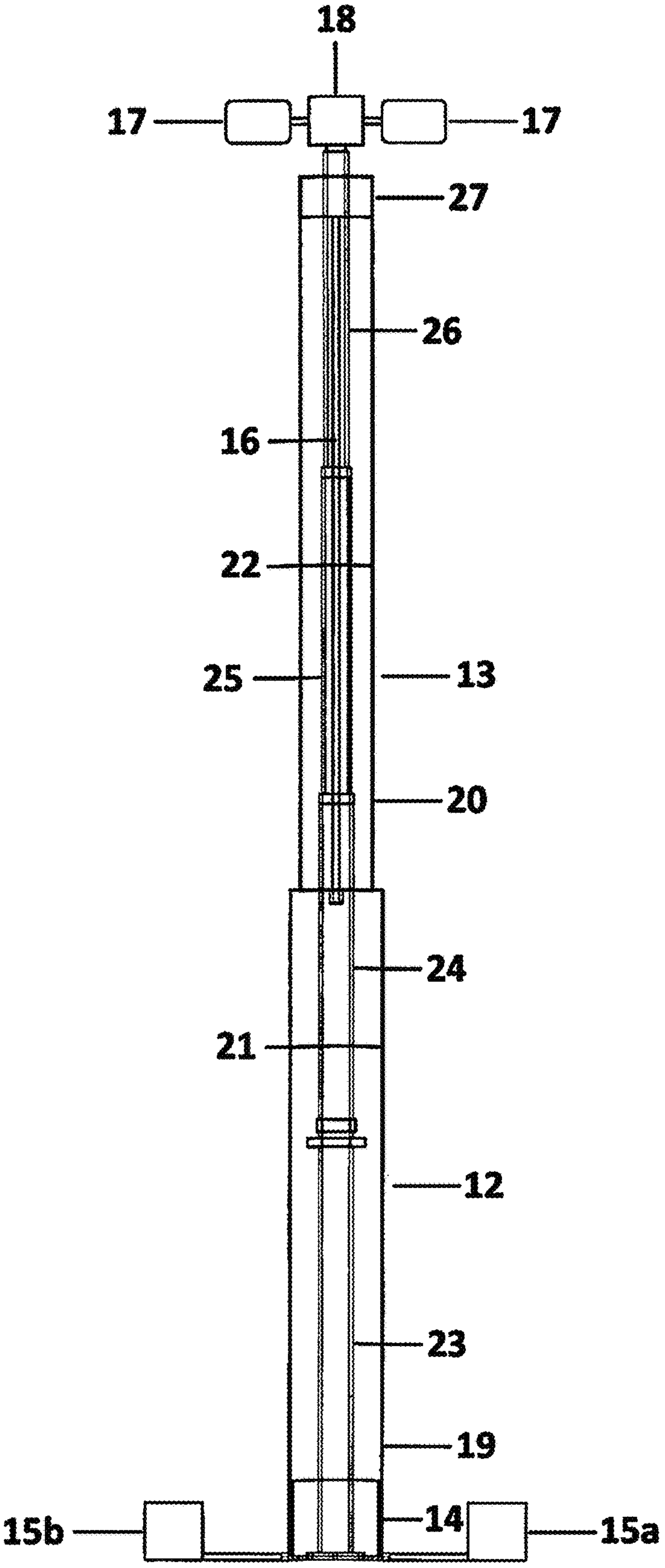
FIG. 5 is a cross section of the telescoping solar power pole with the upper solar power pole fully extended and the telescoping mechanism shown in full profile.
Figure 6:
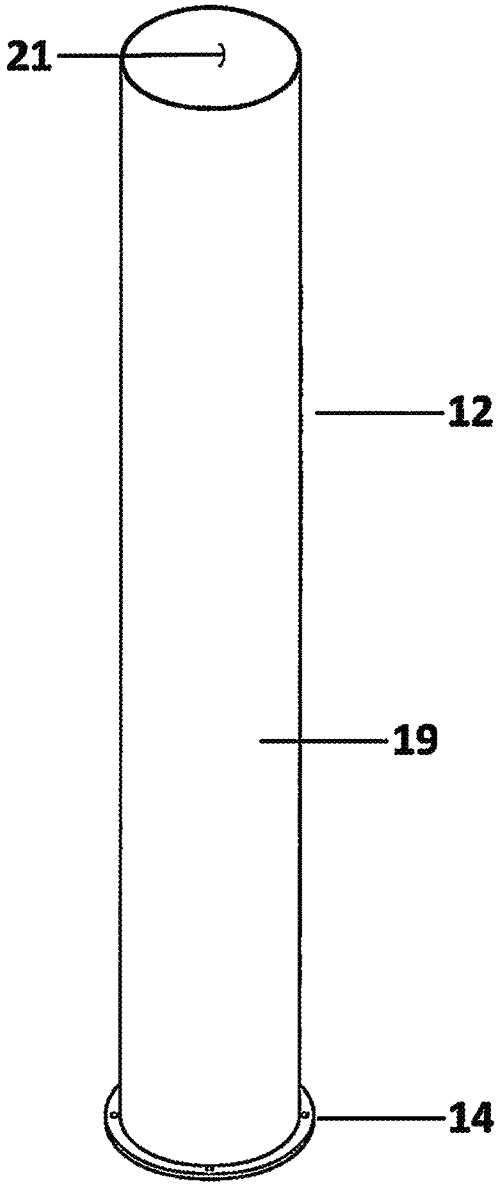
FIG. 6 is a perspective view of the bottom solar pole of the telescoping solar power pole.
Figure 7:
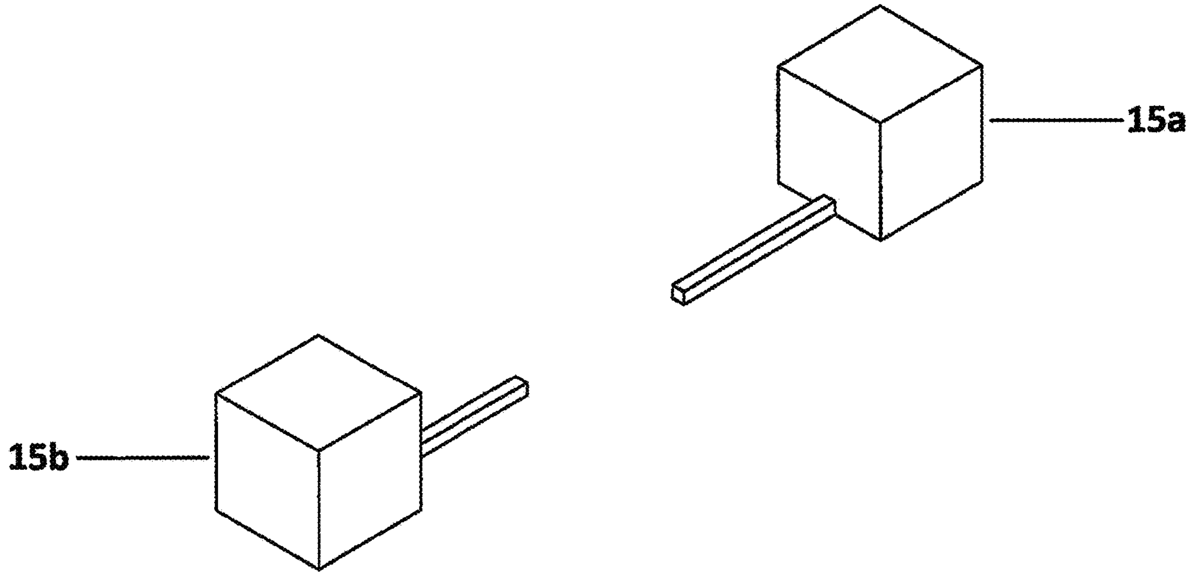
FIG. 7 is a perspective view of a battery box and control box for the telescoping solar power pole.

A cross section of the telescoping solar power pole 11 with the upper solar power pole 13 fully extended and the telescoping mechanism shown in full profile within the telescoping solar power pole 11 is shown in FIG. 5. At the uppermost end of the upper solar power pole 13 is a cap 27 for mounting LED lights, cameras and sensors 17 and a light control box 18. The inner surface 21 of the bottom solar power pole 12 is shown as well as an outer flexible solar panel 19 on the outer surface of the bottom solar power pole 12. The inner surface 22 of the upper solar power pole 13 is shown as well as an outer flexible solar panel 20 on the outer surface of the upper solar power pole 13. As with the fixed length hollow vertical solar power poles 3, the solar power poles 12 and 13 would be directly wired to an encapsulated wiring harness 30 to a battery 31, a controller 32 to regulate charging of the battery 31, and an inverter 33, all of which can be housed in one box or multiple boxes, notwithstanding the depiction of a control and inverter box 15*a* and a battery box 15*b*.

The telescoping mechanism depicted in FIG. 5 housed within the vertical hollow solar power poles 12 and 13 to vertically raise and lower the upper solar power pole 13 comprises a multiplicity of concentrically fitted round or square pistons 23, 24, 25 and 26, attached at the top end to the cap 27 affixed to the upper end of the upper solar power pole, and at the bottom end to the base ring 14 or the upper surface 2*a* of the mobile trailer 2.

I claim:

1. A solar power system for solar power poles with flexible solar panels affixed to the outer surfaces of the poles to provide electric power with a vertical longitudinal axis and mounted on a movable trailer comprising:

at least one hollow solar power pole of fixed length of circular or square cross section with a vertical longitudinal axis, an external surface and having a bottom end and an upper end with a cap and where a flexible solar panel is attached to the external surface;

a movable trailer with wheels, towing hitch, and having an upper surface with lower support rings for direct attachment of the bottom end of solar power poles and an underside with an encapsulated wiring harness with direct connection to the flexible solar panels attached to the external surface of each solar power pole;

a battery for storage of electrical energy from each of the flexible solar panels attached to the external surface of the solar power poles;

a controller to regulate charging of the battery;

an inverter to convert DC power to AC power; and where the upper end cap of the solar power pole has a mounting hole to receive a threaded rod of such length as to reach and pass through a lower mounting hole in the lower support ring on the upper surface of the movable trailer to secure the solar power pole in the lower support ring with nuts and washers.

2. The solar power system of claim 1 where the flexible solar panels further comprise solar laminate film.

3. The solar power system of claim 1 with a telescoping solar power pole with a vertical longitudinal axis to supplement and enhance the capability of the solar power poles affixed to the upper surface of the movable trailer comprising;

at least two vertical hollow solar poles with a bottom solar pole and an upper solar pole, each solar pole having a bottom end and an upper end, the bottom solar pole having a diameter greater than the diameter of the upper solar pole, in order that the upper solar pole can be housed in the lower solar pole, each solar pole having an external surface and internal surface where a flexible solar panel is attached to the external surface of the bottom solar pole and upper solar pole, and a vertical linear guide rail is affixed to the external surface of the upper solar pole to guide vertical movement of the upper solar pole to extend it out and above the bottom solar pole;

a base ring fitted to the bottom end of the bottom solar pole for attachment to the upper surface of a mobile trailer, and a cap end fitted to the upper end of the upper solar pole;

a telescoping mechanism housed within the hollow solar poles to vertically raise and lower the upper solar pole, comprising a multiplicity of concentrically fitted pistons driven by a linear drive mechanism attached at the top to the cap end at the upper end of the upper solar pole, and at the bottom end of the bottom solar pole at the base ring;

LED lights, cameras and sensors mounted to a light control box attached to the cap end at the upper end of the upper solar pole;

a control box to provide remote functionality to the telescoping mechanism and LED lights and cameras and sensors;

a battery box and battery for storage of electrical energy from each of the flexible solar panels attached to the external surface of the solar power poles;

a controller to regulate charging of the battery; and an inverter to convert DC power to AC power.

4. A solar power system for solar power poles with flexible solar panels affixed to the outer surfaces of the poles to provide electric power with a vertical longitudinal axis and mounted on a movable trailer comprising:

at least one hollow solar power pole of fixed length of circular or square cross section with a vertical longitudinal axis, an external surface and having a bottom end and an upper end with a cap and where a flexible solar panel is attached to the external surface;

a movable trailer with wheels, towing hitch, and having an upper surface with lower support rings for direct attachment of the bottom end of solar power poles and an underside with an encapsulated wiring harness with direct connection to the flexible solar panels attached to the external surface of each solar power pole;

where the upper end cap of the solar power pole has a mounting hole to receive a threaded rod of such length as to reach and pass through a lower mounting hole in the lower support ring on the upper surface of the movable trailer to secure the solar power pole in the lower support ring with nuts and washers;

a telescoping solar power pole with a vertical longitudinal axis to supplement and enhance the capability of the solar power poles affixed to the upper surface of the movable trailer comprising;

at least two vertical hollow solar poles with a bottom solar pole and an upper solar pole, each solar pole having a bottom end and an upper end, the bottom solar pole having a diameter greater than the diameter of the upper solar pole, in order that the upper solar pole can be housed in the lower solar pole, each solar pole having an external surface and internal surface where a flexible solar panel is attached to the external surface of the bottom solar pole and upper solar pole, and a vertical linear guide rail is affixed to the external surface of the upper solar pole to guide vertical movement of the upper solar pole to extend it out and above the bottom solar pole;

a base ring fitted to the bottom end of the bottom solar pole for attachment to the upper surface of a mobile trailer, and a cap end fitted to the upper end of the upper solar pole;

a telescoping mechanism housed within the hollow solar poles to vertically raise and lower the upper solar pole, comprising a multiplicity of concentrically fitted pistons driven by a linear drive mechanism attached at the top to the cap end at the upper end of the upper solar pole, and at the bottom end of the bottom solar pole at the base ring;

LED lights, cameras and sensors mounted to a light control box attached to the cap end at the upper end of the upper solar pole;

a control box to provide remote functionality to the telescoping mechanism and LED lights and cameras and sensors;

a battery box and battery for storage of electrical energy from each of the flexible solar panels attached to the external surface of the solar power poles;

a controller to regulate charging of the battery; and an inverter to convert DC power to AC power.

* * * * *